United States Patent
Heitlinger et al.

(10) Patent No.: US 7,530,592 B2
(45) Date of Patent: May 12, 2009

(54) TOWING MECHANISM

(75) Inventors: Martin Heitlinger, Ostingen-Odenheim (DE); Mario Patino, Ludwigshafen (DE)

(73) Assignee: Deere & Company, Moline, IL (US)

( * ) Notice: Subject to any disclaimer, the term of this patent is extended or adjusted under 35 U.S.C. 154(b) by 112 days.

(21) Appl. No.: 11/651,639

(22) Filed: Jan. 10, 2007

(65) Prior Publication Data

US 2007/0145719 A1    Jun. 28, 2007

(51) Int. Cl.
*B60D 1/02* (2006.01)
*B60D 1/60* (2006.01)
*B61G 1/28* (2006.01)

(52) U.S. Cl. .................. 280/515; 280/507; 213/188

(58) Field of Classification Search ............ 280/495, 280/507, 515; 213/188
See application file for complete search history.

(56) References Cited

U.S. PATENT DOCUMENTS

| 1,248,586 | A | * | 12/1917 | Wood ......................... 213/188 |
| 2,441,285 | A | * | 5/1948 | Pfeiffer ....................... 280/477 |
| 2,509,459 | A | | 5/1950 | Stamler |
| 2,593,247 | A | | 4/1952 | Benteman |
| 2,654,613 | A | | 10/1953 | Blair et al. |
| 3,685,864 | A | | 8/1972 | Hall |
| 4,006,917 | A | * | 2/1977 | Liehr et al. ................. 280/451 |
| 4,579,364 | A | | 4/1986 | Kranz |
| 5,193,835 | A | * | 3/1993 | Sheets ..................... 280/414.1 |
| 6,758,486 | B1 | | 7/2004 | Kollath |
| 7,048,294 | B2 | | 5/2006 | Heitlinger |
| 2001/0054807 | A1 | | 12/2001 | Homan et al. |
| 2008/0067785 | A1 | * | 3/2008 | Buerkle et al. .............. 280/515 |

FOREIGN PATENT DOCUMENTS

| DE | 1145494 | 3/1963 |
| DE | 1630585 | 6/1971 |
| DE | 4041838 | 6/1992 |
| DE | 10322933 | 12/2004 |
| FR | 2200797 | 4/1974 |

* cited by examiner

Primary Examiner—Paul N Dickson
Assistant Examiner—Daniel Yeagley

(57) ABSTRACT

A towing mechanism includes a pair of brackets for receiving a drawbar therebetween, and a locking device. A towing bolt is received by locating bores in the brackets. The locking device includes a locking pin which is axially slidable in a pin bore in a component. The locking device is mounted on the upper bracket so that, in a locked condition, the locking pin projects out of the bore and prevents axial movement of the towing bolt. A blocking member at least partially covers the pin bore and prevents the extraneous material from contacting the locking pin, in order to reduce the likelihood of an unintentional release of the towing bolt.

5 Claims, 2 Drawing Sheets

TOWING MECHANISM

FIELD OF THE INVENTION

The invention relates to a towing mechanism with an upper bracket, a lower bracket and a locking device.

BACKGROUND OF THE INVENTION

A known towing mechanism is shown in U.S. Pat. No. 7,048,294, which issued in May 2006 and which is assigned to the assignee of this application. This mechanism is designed for use with a utility vehicle, such as an agricultural tractor. This known towing mechanism includes an upper bracket, a lower bracket and a locking device. Such lower brackets are also referred to as tractor drawbars, and such upper bracket are referred to as a hammerstrap.

An implement drawbar is received between the two brackets and retained by a towing bolt which is received in bores in the brackets. The locking device includes a locking pin which slides axially in a pin bore. The locking pin projects from the pin bore and engages and prevents axial movement of the towing bolt. The locking pin includes a loop-shaped spring which prevents unintentional axial sliding of the locking pin. However, this spring is not designed to resist forces acting on the locking pin in the axial direction of the locking pin, such as caused by a foreign object. Such forces can bend the spring and move the locking pin to an unlocked position freeing the towing bolt. Thus, it would be desirable to provide such a towing mechanism which reduces the risk that a drawbar coupled to the towing mechanism could be released. In order to avoid this possibility, the spring could be made stronger, but this would make the operation of the locking arrangement considerably more difficult.

SUMMARY OF THE INVENTION

Accordingly, an object of this invention is to provide a locking arrangement which is safe and easy to operate.

A further object of the invention is to provide such a towing mechanism which is unlikely to unintentionally release the towing bolt.

These and other objects are achieved by the present invention, wherein a towing mechanism includes an upper bracket spaced apart from a lower bracket for receiving a drawbar therebetween. The brackets have towing bolt bores therein for receiving a towing bolt, and a locking device releasably holding the towing bolt in the bores. The locking device includes a component with a pin bore extending therein for slidably receiving a locking pin. A spring is coupled to the locking pin. The locking device is mounted on the upper bracket so that the locking pin projects out of the pin bore and prevents an axial movement of the towing bolt.

The towing mechanism is provided with a structure or blocking member which prevents a foreign object from acting upon the locking pin, and thereby prevents an unintentional release of a trailer attached to the towing mechanism. Preferably, the blocking member is a projection on the towing bolt which at least partially (preferably completely) covers the cross sectional area of the pin bore or the end of the locking pin with respect to the longitudinal direction of the locking pin or the axis of the bore. In any case, the projection is configured so that, when the vehicle is moving backwards, the projection will prevent an object (such as a branch or a part of a fence) from contacting the locking pin. Alternatively, the blocking member may be a projection which projects from the upper bracket.

The towing bolt preferably includes a radially projecting collar which has a ring-shaped recess formed therein. The locking pin preferably has a groove which is engagable with the collar of the towing bolt to prevent movement of the locking pin caused by vehicle movements and/or vibrations. If the towing bolt contacts the locking pin, the groove on the locking pin engages the collar to limit movement of the locking pin, and thereby reduce the likelihood of an unintentional release of the connection between a towing mechanism and a drawbar.

The locking pin may rotate about its longitudinal axis if it is not secured against rotation. Thus, at its end opposite the towing bolt, the locking pin has a head with a generally square or polygonal cross section. One side of the head can engage a component or the bracket to prevent rotation of the locking pin, and to prevent forces being transmitted to the spring.

A portion of the spring which engages the end face of the locking pin is received in a small groove or recess in the end face of the locking pin, so that the spring is thereby protected against a deformation or destruction, if, for example, the locking pin is brought into its engaged or secured position by means of a hammer that is applied by an operator against the end face of the locking pin.

DESCRIPTION OF THE PREFERRED EMBODIMENT

Figure 1:
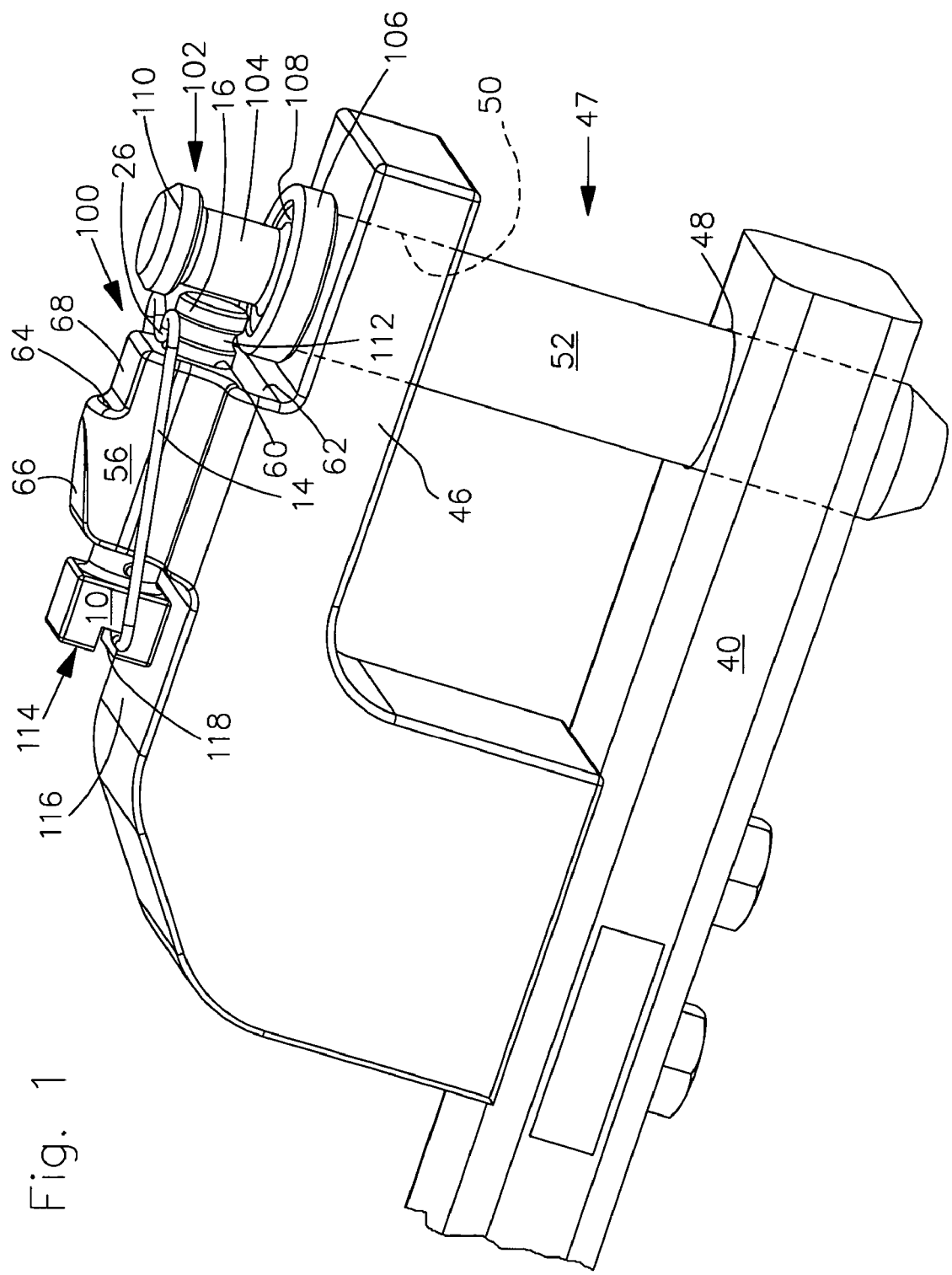
FIG. 1 is a perspective view of a first embodiment of a towing mechanism according to the invention.

The towing mechanism of FIG. 1 includes a lower bracket 40 with a locating bore 48 and an upper bracket 46 with a locating bore 50. A towing bolt 52 can be inserted into the locating bores 48, 50, in order to retain or couple to a drawbar (not shown) of a trailer (not shown). The left end (not shown) of the towing mechanism may be pivotally coupled to a vehicle (not shown). The upper bracket 46 is bolted to lower bracket 40.

The towing mechanism also includes a locking device 100. Locking device has a locking pin 10 and a spring 14 with a loop 26. The pin 10 has a cylindrical shaft section 16 that can be inserted into a bore 60 in component 56. An end of the shaft section has a chamfer in order to simplify its insertion into the bore 60. The locking pin may be configured as shown in U.S. Pat. No. 7,048,294, which is herein incorporated by reference.

The component 56 is fastened to the upper surface of the upper bracket 46, such as by bolting or welding. Or, the component 56 may be formed integrally with the upper bracket 46. The component 56 has a generally rectangular shape and includes a bore 60 which extends generally parallel to the longitudinal axis of bracket 40. The locking pin 10 is inserted into the bore 60 from the side opposite the towing bolt 52 (the left side) so that the chamfer faces the towing bolt 52.

The component 56 has a generally vertical front side 62 which faces the towing bolt 52. The upper part of the component 56 has steps which forms a shoulder 64 which is parallel to the front side 62 and faces in the same direction. The upper surface of the component 56 forms an inclined ramp surface 66. The spacing of ramp surface 66 from the axis of the bore 60 steadily increases in the direction towards the towing bolt 52 and towards shoulder 64.

A blocking member 102 is arranged relative to the locking device 100 to prevent the movement of the locking pin 10 into the free position. The blocking member 102 includes a shaft-shaped or journal-shaped component or neck 104, that is formed by an upward extension of the towing bolt 52. The neck 104 is located adjacent to or in the vicinity of the end surface of a shaft 16 of the locking pin 10. Thereby, the neck 104 covers or overlaps the cross sectional area of the bore 60 of the locking device 100 almost completely, in the sense that the cross sectional area of the neck 104 can be projected upon the cross sectional area of the bore 60 along the longitudinal axis of the locking pin 10. Therefore, an extended portion of the towing bolt 52 protects the end of the shaft 16 of the locking pin 10 from the effects of foreign object damage. In other words, the blocking member at least partially covers the pin bore 60 and prevents extraneous material from contacting the locking pin 10.

Alternatively, the blocking member may be a projection or overhang (not shown) which projects from bracket 46 so that the projection at least partially covers the cross sectional area of the bore 60 along the longitudinal axis of the locking pin 10. Or, the projection (not shown) may be mounted on a side of the component 56. The overhang (not shown) would be configured so that a vertical projection of the overhang at least partially (preferably completely) covers the cross section of the bore 60. In any case, the projection or the overhang (not shown) should be configured so that a towing element (to which no drawbar has been coupled) cannot come into contact with an object during backwards movement the vehicle. The overhang (not shown) could be a one-piece metal component attached to the bracket 46. Or, the overhang (not shown) could be attached to the component 56. Preferably, the overhang would be mounted on the side of the component 56 which is opposite to the side of the component 56 in which the locking pin 10 is inserted.

The towing bolt 52 includes a circular collar 106 which has a lower side which engages the upper side of the upper bracket 46, when the towing bolt 52 is inserted into the locating bores 48, 50. The collar 106 includes a ring-shaped recess 108 which surrounds the longitudinal axis of the towing bolt 52. The towing bolt 52 also includes a shoulder 110 on its upper end. The shoulder 110 has a larger outside diameter than the neck 104. The shoulder 110 is used primarily to simplify the handling of the towing bolt 52, since it can very simply be grasped by an operator, particularly for extracting the towing bolt 52.

A recess or a groove 112 is formed near the end of the shaft 16 of the locking pin 10 along the longitudinal surface. Under certain circumstances the groove 112 may engage the collar 106 of the towing bolt 52, if the towing bolt 52 is moved in its longitudinal direction due to vehicle motion (even if only over small distances). The recess 108 is generally complementary to the groove 112 and comes directly into contact or into engagement with the groove 112. As a result, the locking pin 10 interacts with the collar 106 to prevent movement of the locking pin 10 to the left within the bore 16 into an unlocked position which allows upward of the towing bolt 52. This prevents unintentional upward movement of the towing bolt 52.

At its end facing away from the towing bolt 52, the locking pin 10 is provided with a square end or head 114, which comes to rest against the upper surface 116 of the upper bracket 46. The head 114 prevents rotation of the locking pin 10 about its longitudinal axis. This prevents rotation of the towing bolt 52 from causing a rotation of the locking pin 10, and prevents deformation of the spring 14. A small groove 118 is formed on the end face side of the head 114 and protects the part of the spring 14 which engages the head 114 from deformation or destruction, in case an operator would like to bring the locking pin 10 into the locked position by using a hammer against the head 114.

Figure 2:
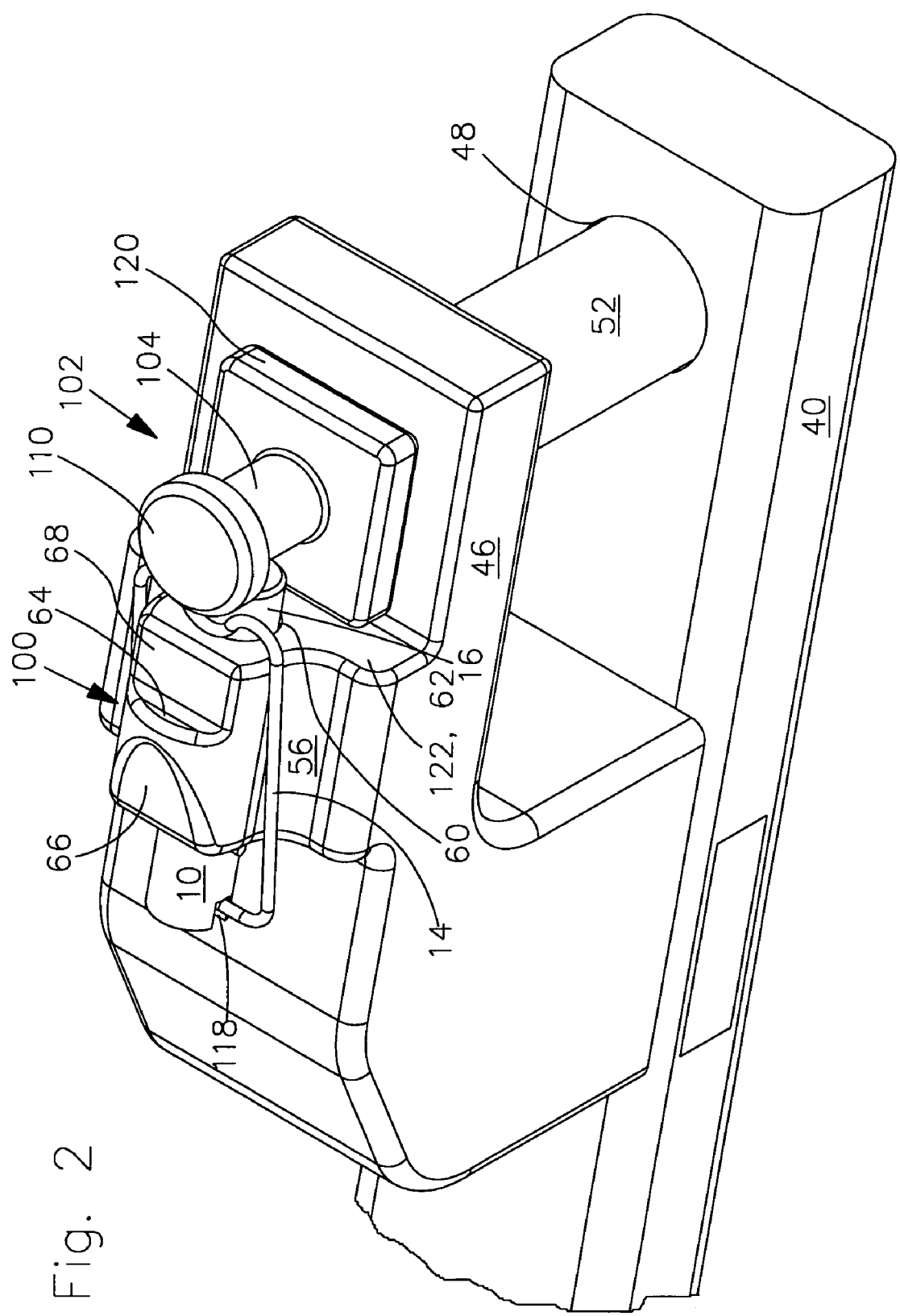
FIG. 2 is a perspective view of a second embodiment of a towing mechanism according to the invention.

Referring now to FIG. 2, in an alternative embodiment, the towing bolt 52 includes a radially projecting generally rectangular shaped collar 120 which rests on an upper surface of the upper bracket 46. The collar 120 is engagable with a shoulder surface 122 of the component 56 and therefore prevents rotation of the towing bolt 52. In this embodiment the locking pin 10 does not have a groove near the end which faces towards the towing bolt 52. However, a groove similar to groove 112 of FIG. 1, could be provided. Similarly, a rectangular recess (not shown) could be provided on the collar 120 to prevent unintentional movement of the locking pin 10 into the free position.

The towing mechanism operates as follows. Initially, the chamfered end of pin 10 inserted (from the left) into the bore 60 of the component 56. Then the spring 14 is lifted by the operator and deposited on the ramp 66 of the component 56. Then the pin 10 is slid further into the bore 60. The spring 14 slides on the ramp 66 until the loop 26 reaches the end face 64 and snaps in the direction of the pin 10. Now the pin 10 can no longer be retracted without lifting the spring 14, which requires considerable application of force due to the height of the ramp 66. Thereby the locking pin 10 is secured on the component 56 so that it cannot be lost.

The towing bolt 52 is lifted and withdrawn from the locating bore 48, so that a drawbar (not shown) can be inserted into the space 47. At that point the locking pin 10 is in its unlocked position, in which the free end of the shaft section 16 does not project upward out of the component 56 and does not have any effect on the towing bolt 52. When the opening of the drawbar is aligned with the locating bores 48, 50, the towing bolt 52 is moved downward and inserted through the drawbar and into the locating bore 48. Then the head 120 of the towing bolt 52 rests on the upper side of the upper bracket 46. So that the drawbar cannot be released unintentionally, the towing bolt 52 is locked in this position. For this purpose the locking pin 10 need only be slid in the direction of the towing bolt 52, until the spring 14 snaps behind the front side 62 of the component 56. At that time the free end of the shaft section 16 slides will prevent upward movement of the towing bolt 52.

In order to unlock the towing bolt 52 the operator must lift the spring 14 with a certain effort and deposit it on the surface 68. Now the locking pin 10 can be retracted until the spring 14 has reached the shoulder 64 and the free end of the pin 10 is drawn into the bore 60 and no longer interferes with movement of the towing bolt 52. Now the towing bolt 52 can be extracted upward and the drawbar can be uncoupled from the towing mechanism.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A towing mechanism having a pair of spaced apart brackets for receiving a drawbar therebetween, the brackets having towing bolt bores therein for receiving a towing bolt, and a locking device releasably holding the towing bolt in the bores, the locking device having a component with a pin bore extending therein for slidably receiving a locking pin, the locking device being mounted on one of the brackets so that the locking pin projects out of the pin bore and prevents an axial movement of the towing bolt, characterized by:

a blocking member for preventing unintended movement of the locking pin into a free position;

the towing bolt including a radially projecting collar with a ring-shaped recess; and the locking pin including a groove which engages the collar.

2. The towing mechanism of claim 1, wherein:

the blocking member comprises a projection which projects from the towing bolt and which at least partially covers a cross sectional area of the pin bore in a longitudinal direction of the locking pin.

3. The towing mechanism of claim 2, wherein:

the projection is adjacent to a side of the component which faces towards an attachment point of the towing bolt.

4. The towing mechanism of claim 1, wherein:

the blocking member comprises a portion of the towing bolt which at least partially covers the pin bore.

5. The towing mechanism of claim 1, wherein:

the locking pin has a head with a square cross section on an end which extends away from the towing bolt.

* * * * *